United States Patent [19]
Mori et al.

[11] Patent Number: 5,370,438
[45] Date of Patent: Dec. 6, 1994

[54] STRUCTURAL MEMBER OF AUTOMOBILE

[75] Inventors: Takeo Mori, Shizuoka; Eiichi Hamada, Aichi, both of Japan

[73] Assignee: Toyota Jidosha Kabushiki Kaisha, Toyota, Japan

[21] Appl. No.: 235,224

[22] Filed: Apr. 29, 1994

Related U.S. Application Data

[63] Continuation of Ser. No. 969,080, Oct. 30, 1992, abandoned.

[30] Foreign Application Priority Data

Oct. 31, 1991 [JP] Japan .................. 3-311467
Dec. 17, 1991 [JP] Japan .................. 3-352893

[51] Int. Cl.$^5$ ............................... B62D 25/08
[52] U.S. Cl. ................... 296/203; 296/30; 296/194; 296/204; 296/209
[58] Field of Search .............. 296/29, 30, 194, 203, 296/204, 209

[56] References Cited

U.S. PATENT DOCUMENTS

| | | | |
|---|---|---|---|
| 1,541,837 | 6/1925 | Maise | 296/209 |
| 4,669,776 | 6/1987 | Harasaki | 296/194 |
| 5,213,386 | 5/1993 | Janotik et al. | 296/30 X |

FOREIGN PATENT DOCUMENTS

| | | | |
|---|---|---|---|
| 4020363 | 1/1992 | Germany | 296/204 |
| 53966 | 5/1981 | Japan | 296/209 |
| 60-51183 | 4/1985 | Japan . | |
| 115779 | 6/1986 | Japan | 296/194 |
| 26171 | 2/1987 | Japan | 296/209 |
| 39375 | 2/1987 | Japan | 296/209 |
| 182178 | 7/1989 | Japan | 296/194 |
| 316580 | 2/1991 | Japan . | |

*Primary Examiner*—Dennis H. Pedder
*Attorney, Agent, or Firm*—Cushman, Darby & Cushman

[57] ABSTRACT

A front side member of an automobile has a rigid portion formed in a closed cross section by an inner panel and an outer panel and extending in the longitudinal direction of a car body, and a base portion extending inwards and downwards in the lateral direction of the car body from the rigid portion. The rigid portion is provided with a reinforcement arranged in the closed cross section and extending in the longitudinal direction of the car body. The reinforcement is shortened less than the inner panel at a top portion thereof and provided with a linear corner portion. As a result, an axis, which is one of rectangular coordinate axes as principal axes of the closed cross section and which maximizes a moment of inertia with respect to the axis, is formed so as to direct downwards from the outside to the inside in the lateral direction of the car body.

1 Claim, 16 Drawing Sheets

FIG. 16
PRIOR ART
(a)
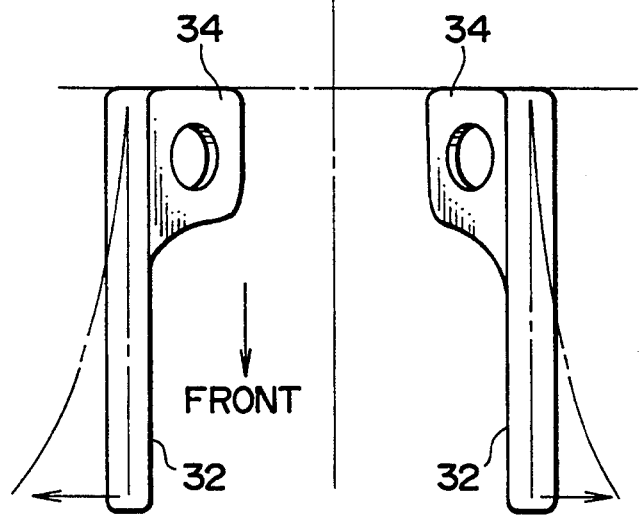
(b)
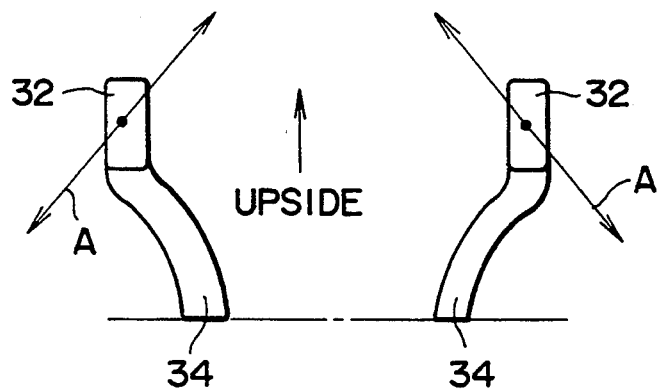
(c)
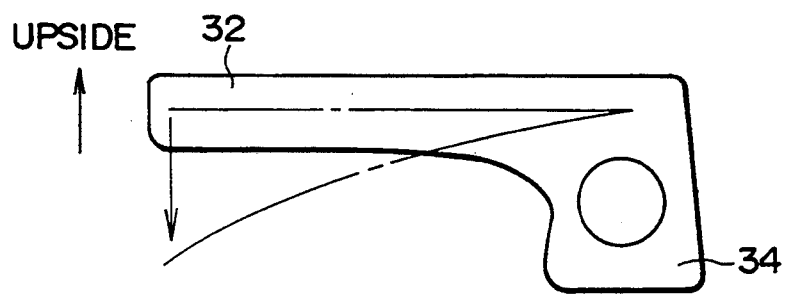

5,370,438

STRUCTURAL MEMBER OF AUTOMOBILE

This is a continuation of application Ser. No. 07/969,080, filed on Oct. 30, 1992, which was abandoned upon the filing hereof.

BACKGROUND OF THE INVENTION

1. Field of the Invention

This invention relates to a front side member, a side sill and other structural members of an automobile provided with a rigid portion formed in a closed cross section by an inner panel and an outer panel.

In the structural members of the automobile, there are a front side member 22 and a rocker, that is, a side sill 24 which extend in the longitudinal direction of a car body 20, and, in addition, a cowl 26 located between the front side member 22 and the side sill 24 and extending in the lateral direction of the car body 20 as shown in FIG. 13. The present invention, however, relates to a structural member extending in the longitudinal direction of the car body.

2. Description of the Prior Art

As shown in FIGS. 14 and 15, the front side member 22 is provided with a rigid portion 32 formed in a closed cross section by an inner panel 28 and an outer panel 30 and extending in the longitudinal direction of the car body, and a base portion 34 extending inwardly and downwardly in the lateral direction of the car body from the rigid portion 32 (refer to Japanese Utility Model Public Disclosure (KOKAI) No. 3-16580). A reinforcement 36 having a cross section providing a so-called "hat shape" is provided in the closed cross section to enhance the rigidity of the rigid portion 32.

Since the base portion 34 extends from the rigid portion 32 into the car body inwardly in a front view thereof as shown in FIG. 16, the rigid portion 32 is vibrated between the upper inside and the lower outside in the car body as indicated by an arrow A when any vertical vibrations are applied to the car body during running of the automobile.

On the other hand, the closed cross section of the rigid portion 32 of the front side member is substantially symmetrical with respect to a horizontal plane thereof as shown in FIG. 15. Therefore, rectangular coordinate axes $I_1$ and $I_2$ as principal axes of the closed cross section are set as illustrated. Namely, the axis $I_1$ is horizontally located at the center of the closed cross section, and the axis $I_2$ is located perpendicular to the axis $I_1$. Herein, in the axis $I_1$, a moment of inertia with respect to the axis $I_1$ is maximized, and in the axis $I_2$, a moment of inertia with respect to the axis $I_2$ is minimized.

Since the rigid portion of the front side member is vibrated between the upper inside and the lower outside of the car body at the time of running of the automobile, and in the rectangular coordinate axes as principal axes of the closed cross section in the rigid portion, the axis $I_2$ is perpendicularly located so that the rigidity in the lateral direction is reduced. The rigid portion may sometimes resonate with the vibration at a relatively low frequency, e.g., the vibration of a suspension system at 20 to 30 Hz.

The structure of the side portion in the car body is provided with the side sill 24, a roof side rail 40 extending in the longitudinal direction of the car body and arranged upwards at an interval from the side sill 24, further, a front pillar 42, a center pillar 44 and a quarter panel 46, and the structure is integrally formed from these members, as shown in FIG. 19. The side sill 24 is formed so as to present a closed cross section by an inner panel 48 and an outer panel 50, as shown in FIG. 17 (refer to Japanese Utility Model Public Disclosure (KOKAI) No. 60-51183).

Since the shape of the side sill 24, in particular, that of the outer panel 50 appears itself on the outside, the shape is decided with a view of satisfying any demands with respect to a design and easily connecting to the center pillar 44, while a rigidly thereof is taken into consideration. However, the rigidity is not determined in consideration of the directions of two rectangular coordinate axes as principal axes of the closed cross section in the side sill 24 in connection with other members.

In the two rectangular coordinate axes $I_1$ and $I_2$ which become principal axes of the closed cross section in the side sill 24, the axis $I_1$ extending in the direction of minimizing a moment of inertia is directing to the inside and upside of the car body as shown in FIG. 17. Therefore, the side sill 24 is easily transformed in the direction of the axis $I_1$. When the car body is vibrated in a vertical direction, vibrational component f in a left or right direction arises in the side sill 24 to thereby vibrate the center pillar 44 in the left or right direction.

When the center pillar 44 is vibrated in a left or right direction, a leftward or rightward vibration is induced at the upside portion of the car body and the booming noise in the compartment of the car is enlarged. In addition, the distribution of moment M of the center pillar by an external force F applied on the side sill 24 becomes as shown in FIG. 18, and since a large torsional moment is generated in the roof side rail 40, the resulting apparent rigidity of the car body is lowered.

SUMMARY OF THE INVENTION

It is an object of the present invention to provide a structure member of an automobile, which is provided with a rigid portion and which can reduce any vibrations applied on the rigid portion.

Another object of the present invention is to prevent the rigid portion from resonating with the vibration at a relatively low frequency in case the structural member is a front side member.

A further object of the present invention is to reduce any leftward or rightward vibration yielded in a side sill and also to reduce a moment applied on a roof side rail in case the structural member is the side sill.

The present invention provides a structural member of an automobile having a rigid portion formed in a closed cross section by an inner panel and an outer panel and extending in the longitudinal direction of a car body. The rigid portion has at least either one of a reinforcement arranged in the closed cross section and a specially processed portion. The shape and the arrangement in the rigid portion of at least one of the reinforcement and the specially processed portion are both determined so that one of the rectangular coordinate axes as principal axes of the closed cross section may extend in a predetermined direction so as to reduce any vibrations applied on the rigid portion.

In one aspect of the present invention, the structural member is a front side member of the automobile and further is provided with a base portion extending inwardly and downwardly in the lateral direction of the car body from the rigid portion. In one mode of this aspect, the rigid portion has at least one reinforcement disposed in the closed cross section and extending in the longitudinal direction of the car body. The reinforcement is formed so that an axis, which is one of the rectangular coordinate axes as principal axes of the closed cross section and which maximizes a moment of inertia with respect to the axis, may direct downwards from the outside to the inside in the lateral direction of the car body.

In another mode of the aspect, the rigid portion has at least one specially processed portion extending in the longitudinal direction of the car body. The specially processed portion is formed so that an axis, which is one of the rectangular coordinate axes as principal axes of the closed cross section and which maximizes a moment of inertia with respect to the axis, may direct downwardly from the outside to the inside in the lateral direction of the car body.

In another aspect of the present invention, the structural member is a side sill, and the automobile is further provided with a roof side rail, which is formed so as to have a closed cross section by a plate material and arranged in the longitudinal direction of the car body, at an interval in the upper direction of the side sill. The side sill is formed so that an axis, which is one of the rectangular coordinate axes as principal axes of the closed cross section in the side sill and which maximizes a moment of inertia with respect to the axis may pass through the closed cross section of the roof side rail.

In accordance with the present invention in one aspect, the axis, which maximizes the moment of inertia with respect to the axis, is directed downwardly from the outside to the inside in the lateral direction of the car body, therefor, the rigidity in the vibrational direction of the rigid portion is increased.

Since the rigidity in the vibrational direction of the rigid portion is increased, the resonating frequency of the rigid portion becomes higher and any phenomena resonating with any low frequency vibrations can be prevented.

In accordance with the present invention in another aspect, the side sill tends to transform in the direction of the closed cross section of the roof side rail. However, since the distance between the roof side rail and the side sill in a left or right direction or in a lateral direction thereof is slight, any leftward or rightward vibrational components applied on the side sill are lessened when the car body is vibrated in a vertical direction. In the roof side rail, the moment distribution of the center pillar is substantially zero.

Since the vibrational components in the left or right direction of the side sill is lessened, the upside portion of the car body is hardly vibrated in a left or right direction thereof. Therefore, any booming noise arisen by this kind of vibration within the compartment can be lowered.

Since the moment distribution of the center pillar is substantially zero at the roof side rail, the apparent rigidity of the car body can be enhanced.

BRIEF DESCRIPTION OF THE DRAWINGS

The forgoing and other objects and features of the invention will become apparent from the following description of preferred embodiments of the invention with reference to the accompanying drawings, in which:

FIGS. 16a–16c are schematic views showing operation of the front side member shown in FIG. 14 in plan, front, and side views, respectively.

DETAILED DESCRIPTION OF THE PREFERRED EMBODIMENTS

Figure 1:
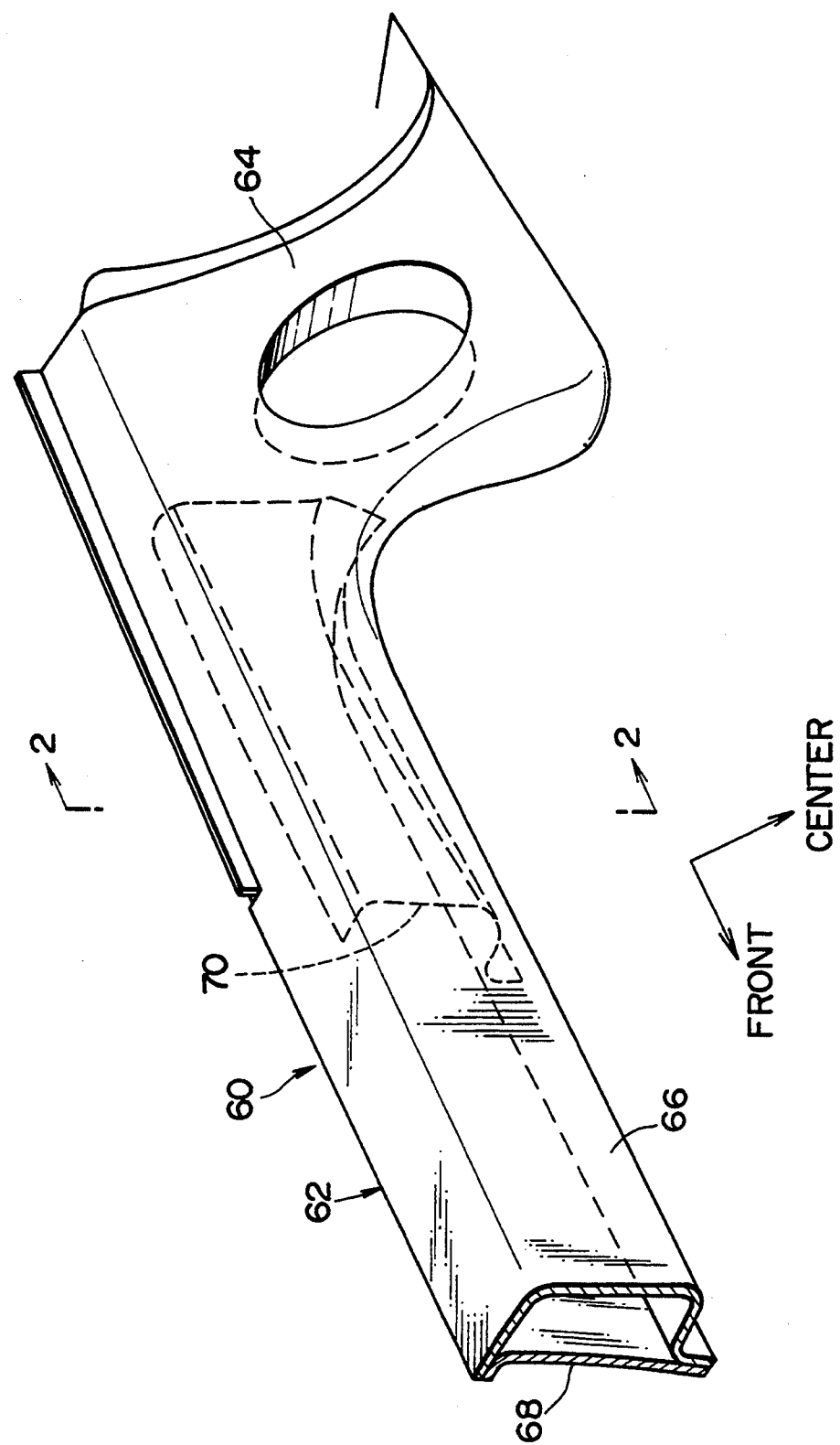
FIG. 1 is a perspective view showing a front side member of an automobile as a preferred embodiment of the present invention, the front side member being disposed at the right side of a car body.
Figure 2:
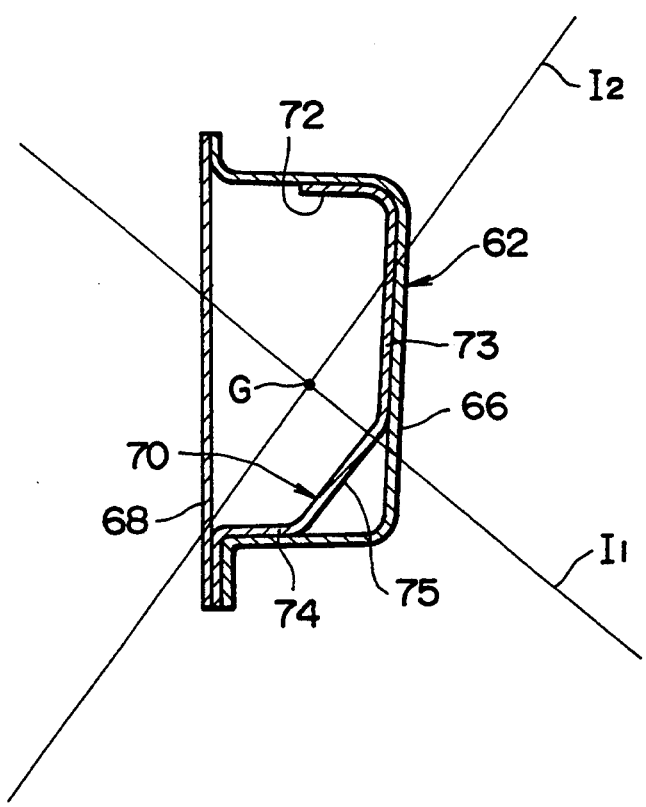
FIG. 2 is a sectional view taken along a line 2—2 of FIG. 1.

A structural member of an automobile as shown in FIGS. 1 and 2 is a front side member 60 and includes a rigid portion 62 extending in the longitudinal direction of a car body, and a base portion 64 extending inwardly and downwardly in the lateral direction of the car body from the rigid portion 62.

The rigid portion 62 is formed in a closed cross section by an inner panel 66 and an outer panel 68. In the illustrated embodiment, the inner panel 66 comprises a member having a cross section presenting a channel form, and the outer panel 68 comprises a plate. The end rims of the inner panel 66 are connected to the end rims of the outer panel 68 by spot welding in the longitudinal direction of the car body so as to set up a closed cross section, resulting in the formation of the rigid portion 62. The base portion 64 is arranged in a predetermined shape by extending the inner panel 66 and the outer panel 68 of the rigid portion 62 inwardly and downwardly in the lateral direction of the car body.

The rigid portion 62 is provided with a reinforcement 70 arranged in the closed cross section of the rigid portion and extending in the longitudinal direction of the car body. The reinforcement 70 is formed so that an axis $I_1$, which is one of rectangular coordinate axes as principal axes of the closed cross section and which maximizes a moment of inertia with respect to the axis, may direct downwardly from the outside to the inside in the lateral direction of the car body.

In the illustrated embodiment, the reinforcement 70 is made of a plate including an upper portion 72 having a lateral length which is equal to be approximately half lateral length of the inner panel 66, and a linear corner portion 75 provided between an intermediate portion 73 and a lower portion 74 thereof. The reinforcement 70 is mounted by spot welding on the inner panel 66 at the upper portion 72 and further on the inner panel 66 and the outer panel 68 at the flange portion continuing to the lower portion 74, respectively. Further, the reinforcement 70 is arranged in the closed cross section of the rigid portion 62.

Since the reinforcement 70 is constituted as described above, in the rectangular coordinate axes $I_1$ and $I_2$ passing through the center G of the closed cross section in the rigid portion 62, a moment of inertia with respect to the axis $I_1$ is maximized and a moment of inertia with respect to the axis $I_2$ is minimized. Accordingly, the axis $I_1$ directs downwardly from the outside to the inside in the lateral direction of the car body.

Figure 3:
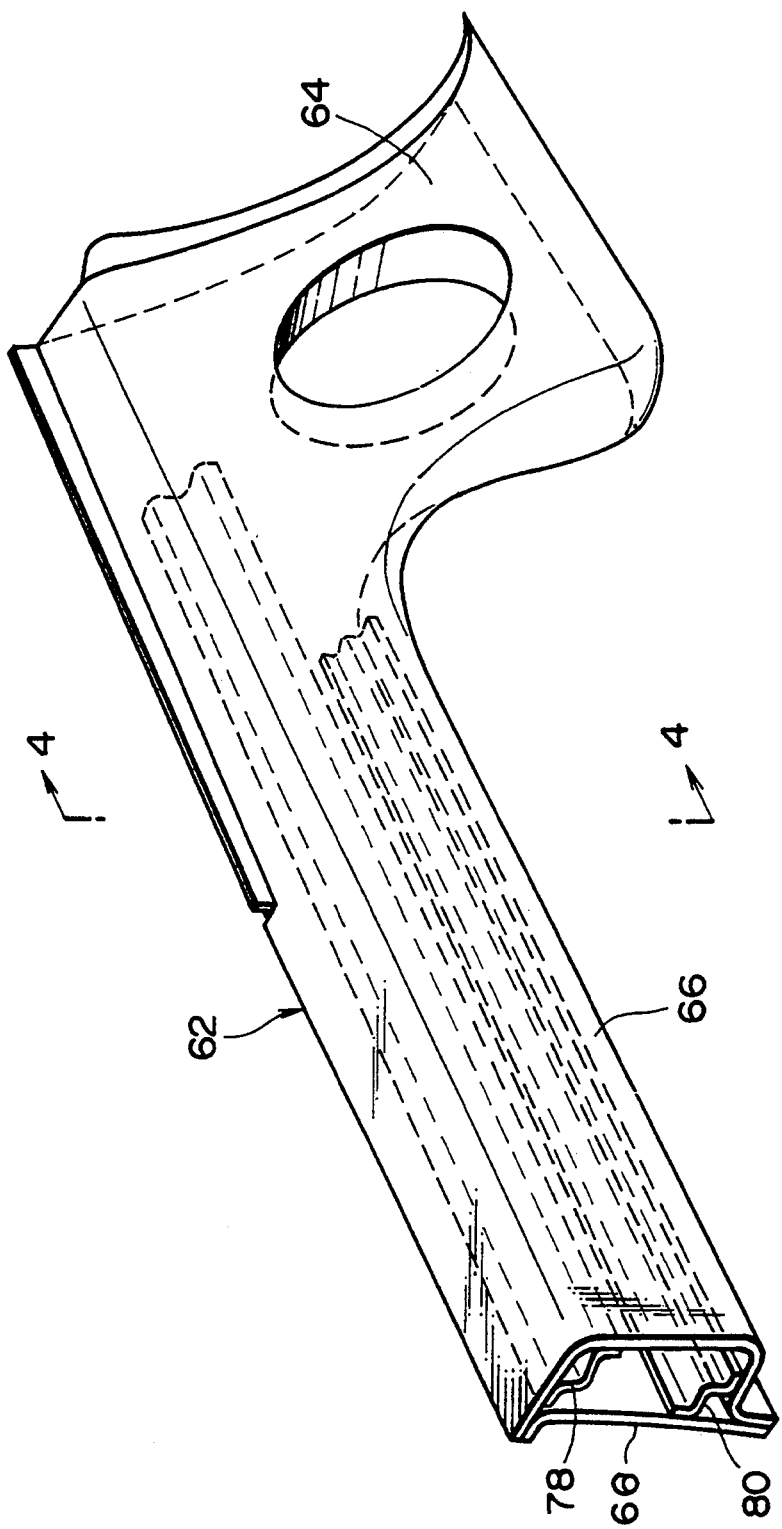
FIG. 3 is a perspective view showing a front side member of an automobile as another preferred embodiment of the present invention.
Figure 4:
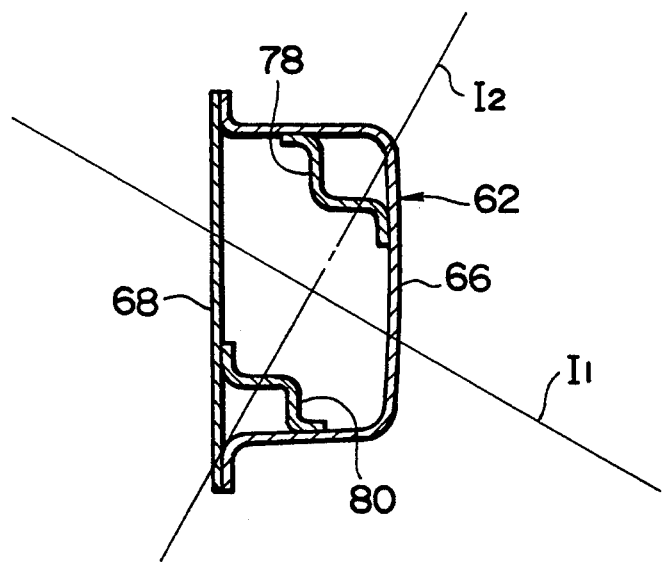
FIG. 4 is a sectional view taken along a line 4—4 of FIG. 3.

An embodiment shown in FIGS. 3 and 4 is similar to the embodiment shown in FIGS. 1 and 2 in such constitution that the rigid portion 62 extending in the longitudinal direction of the car body is formed in the closed cross section by the inner panel 66 and the outer panel 68 and that the base portion 64 extends inwardly and downwardly in the lateral direction of the car body from the rigid portion 62.

In this embodiment, two reinforcements 78 and 80, instead of one reinforcement, are arranged in the closed cross section of the rigid portion 62. The reinforcements 78 and 80 are formed approximately in a crank shape. The reinforcement 78 is mounted on the upper, inward portion of the closed cross section and the reinforcement 80 is mounted on the lower, outward portion of the closed cross section, respectively. As a result, the axis $I_1$ directs downwardly from the outside to the inside in the lateral direction of the car body.

Figure 5:
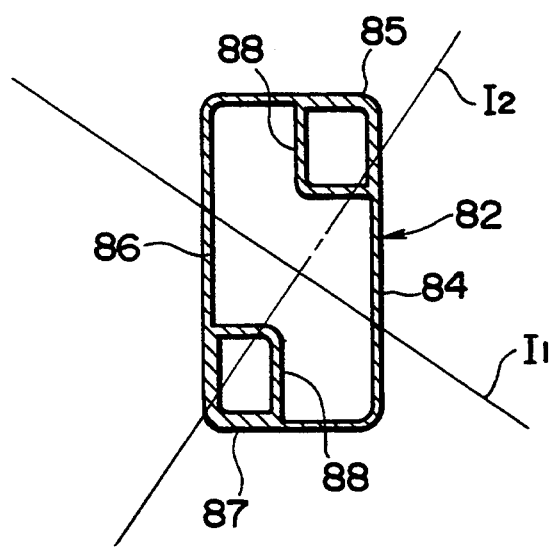
FIG. 5 is a similar sectional view to FIG. 4 but showing a front side member of an automobile as a further preferred embodiment of the present invention.

In an embodiment shown in FIG. 5, a rigid portion 82 is formed by extruding aluminum, and a closed cross section is defined by an inner panel 84 and an outer panel 86. Then, the thickness of an upper inner connection portion 85 between the inner panel 84 and the outer panel 86 and that of a lower outer connection portion 87 are both enlarged more than the thicknesses of other portions. Furthermore, a reinforcement 88 is provided while opposing to each connection portion. As a result, the axis $I_1$ directs downwardly from the outside to the inside in the lateral direction of the car body.

In the embodiment shown in FIG. 5, the thicknesses of the connection portions 85 and 87 are enlarged, and the reinforcement 88 is provided. Instead of this constitution, it may be good only to enlarge the thicknesses or the reinforcement 88 only may be provided by mutually equalizing the thicknesses of the inner panel 84 and the outer panel 86.

Figure 8:
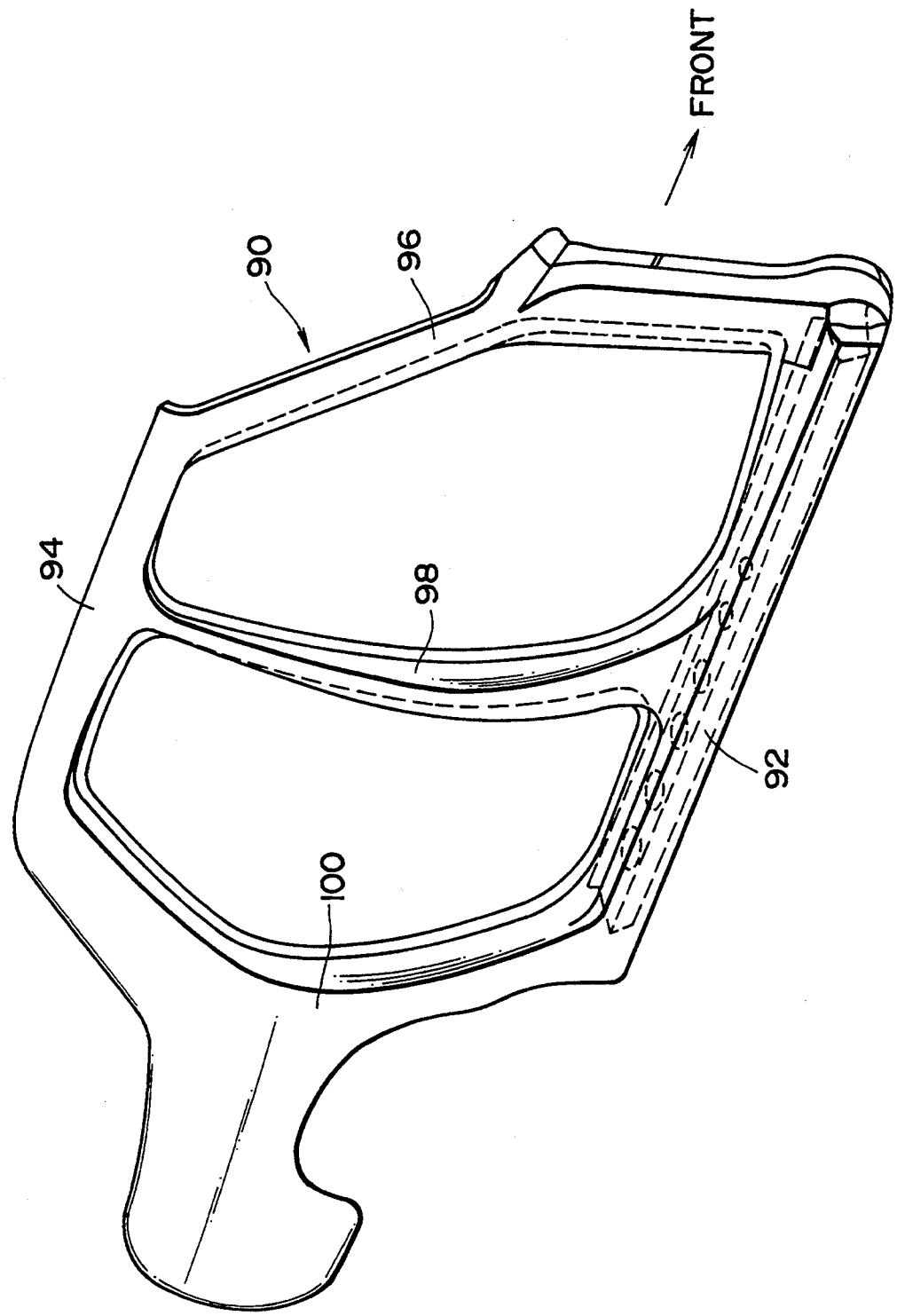
FIG. 8 is a perspective view showing a side structure of an automobile incorporated with a side sill according to the present invention.

In a side structure 90 of the car body, the structural member is a side sill 92, as shown in FIG. 8. The side structure is, further, provided with a roof side rail 94, a front pillar 96, a center pillar 98 and a quarter panel 100. The side structure is integrally formed from these members. The front pillar 96, the center pillar 98 and the quarter panel 100 have the similar structures to those in a prior art. Since the connection structures of these members to the roof side rail 94 or the side sill 92 are similar to those in a prior art, the detailed description will be omitted.

The roof side rail 94 is formed by a plate to have a closed cross section and provided in the longitudinal direction of the car body.

Figure 6:
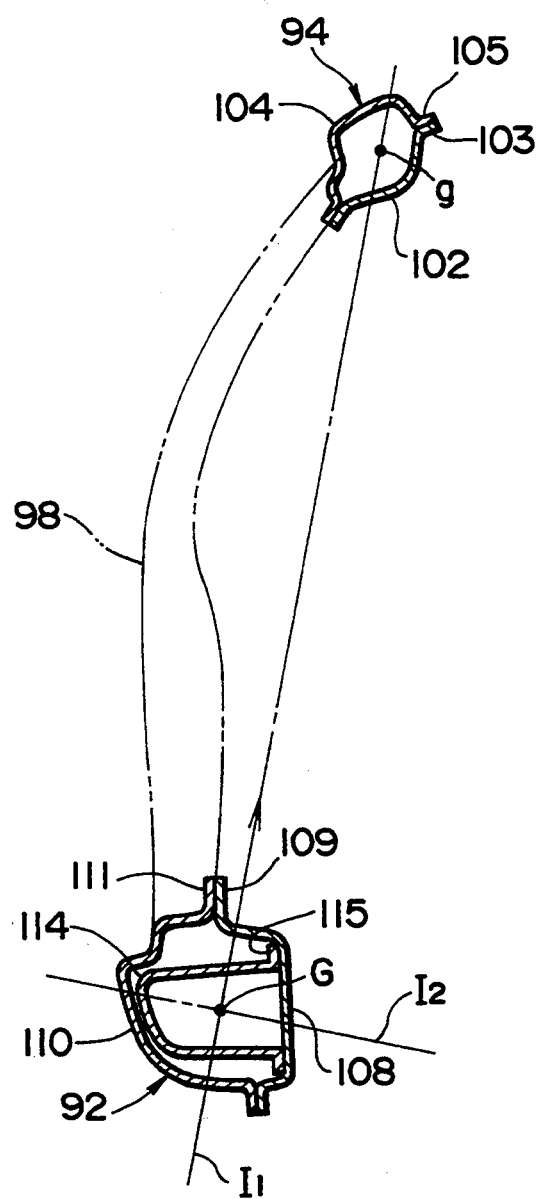
FIG. 6 is a sectional views showing a side sill and a roof side rail of an automobile as a preferred embodiment of the present invention.

In an embodiment shown in FIG. 6, the roof side rail 94 is provided with an inner panel 102 having a convex to the inside of the car body and an outer panel 104 having a convex to the outside of the car body. The mutually opposing flanges 103 and 105 of both the panels are connected by spot welding, and the closed cross section is defined.

The side sill 92 is formed by plates so as to have a closed cross section and provided in the longitudinal direction of the car body at an interval from the roof side rail 94 downwards.

In the embodiment shown in FIG. 6, the side sill 92 is provided with an inner panel 108 having a convex to the inside of the car body and an outer panel 110 having a convex to the outside of the car body. The mutually opposing flanges 109 and 111 of both the panels are connected by spot welding, and a closed cross section is defined. Furthermore, the side sill 92 is provided with a reinforcement 114 arranged in the closed cross section. The reinforcement 114 is connected by spot welding to the inner panel 108 at a flange 115 thereof.

The inner panel 108 and the outer panel 110 of the side sill 92 have substantially the same shade as those of the inner panel 48 and the outer panel 50 of the side sill 24 in a prior art. However, as a result of being provided with the reinforcement 114, an axis $I_1$, which is one of two rectangular coordinate axes as principal axes of the closed cross section in the side sill 92, and maximizes a moment of inertia with respect to the axis, that is, an axis extending in the direction of minimizing the moment of inertia, passes through the closed cross section of the roof side rail 94.

Figure 9:
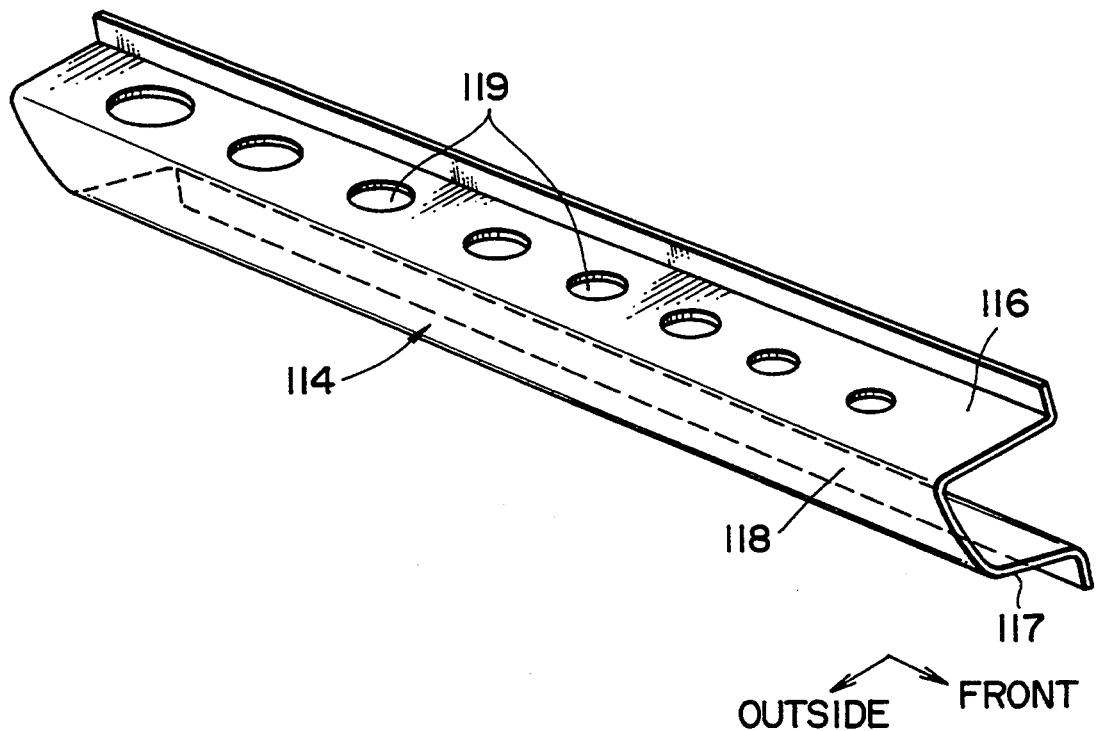
FIG. 9 is a perspective view showing a reinforcement provided on the closed cross section of a side sill.

As shown in FIG. 9, the reinforcement 114 has a top face 116, a bottom face 117 and an inclined face 118 for combining both the faces to each other, and the top face 116 is laterally longer than the bottom face 117. The top face 116 has a plurality of holes 119 at an interval in the longitudinal direction, and the rigidity of the top face 116 is lowered. The bottom face 117 has a plurality of holes with a same phase as the rod face 116, and the illustration thereof will be omitted.

In an illustrated embodiment, the plurality of holes 119 are formed so that the diameters may be gradually enlarged in the direction from the front to the back. According to this arrangement of the plurality of holes 119, when the car happens to collide by accident during running, greater amounts of striking energy are absorbed into the front portion of the reinforcement 114, and the reinforcement 114 enables to transform in substantially same degrees in the direction from the front to the rear.

Since the reinforcement 114 is constituted as described above, the reinforcement 114 shows a character of a high flexural rigidity in a left or right direction thereof and low flexural rigidity in a vertical direction thereof. As a result, in the side sill 92, in two rectangular coordinate axes $I_1$ and $I_2$, which pass through the center G of figure of the closed cross section and become principal axes thereof, a moment of inertia with respect to the axis $I_1$ is maximized and a moment of inertia with respect to the axis $I_2$ is minimized, as shown in FIG. 6. In other words, the axis $I_1$ extends in the direction of minimizing the moment of inertia. In addition, the axis $I_1$ also passes through the closed cross section of the roof side rail 94.

Figure 7:
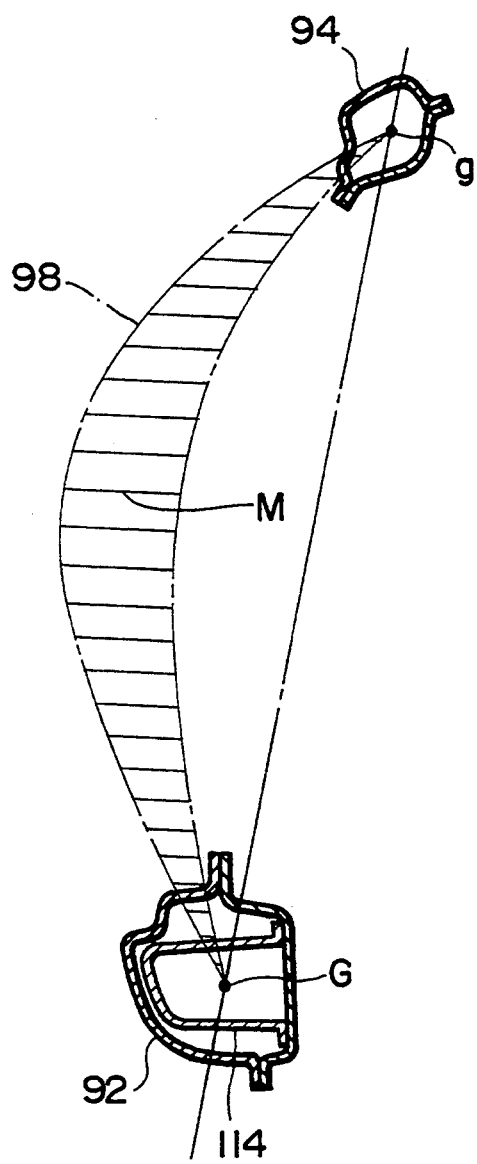
FIG. 7 is a similar sectional view to FIG. 6 but showing a moment distribution of a center pillar.

Since the axis $I_1$ passes through the closed cross section of the roof side rail 94, any vibrational components in a left or right direction thereof when the car body is vibrated in a vertical direction can be lessened. In this case, it is preferable that the axis $I_1$ passes through the center g of the closed cross section in the roof side rail. In this manner, the distribution of the moment M in the center pillar 98 becomes as shown in FIG. 7, and the moment in the roof side rail 94 becomes zero.

Figure 10:
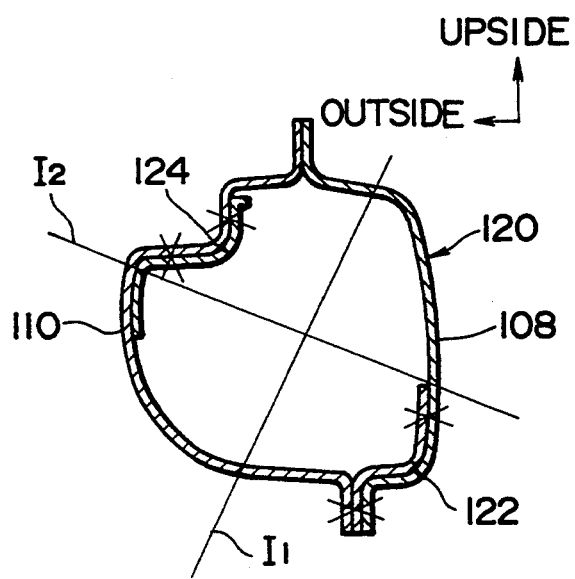
FIG. 10 is a sectional view showing a preferred embodiment for varying the directions of two rectangular coordinate axes which become principal axes.
Figure 11:
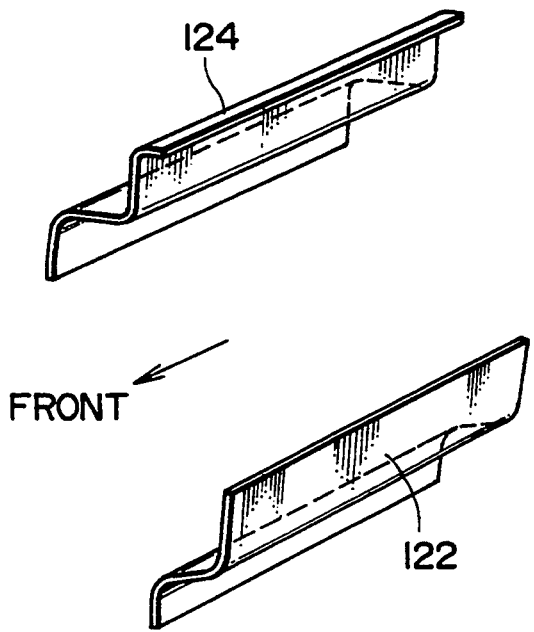
FIG. 11 is a perspective view showing reinforcements used in the preferred embodiment in FIG. 10.

In order to form the side sill so that an axis, which extends in the direction of minimizing the moment of inertia, among two rectangular coordinate axes as principal axes of the closed cross section, may pass through the closed cross section of the roof side rail 94, it may be also possible to do as follows:

In a side sill 120 shown in FIG. 10, a closed cross section is defined by the inner panel 108 and the outer panel 110, and reinforcements 122 and 124 as showing in FIG. 11 are welded to the shoulder portion at the bottom of the inner panel 108 and the shoulder portion at the top of the outer panel 110, respectively. The axis $I_1$ is passed through the closed cross section of the roof side rail.

Instead of welding the reinforcements 122 and 124 in the embodiment shown in FIG. 10, it is also possible to thicken the thicknesses of the portions of the inner panel 108 and the outer panel 110, to which the reinforcements are welded respectively. In this case, the resulting thick portion is connected to the thin portion by laser welding so as to form the inner panel 108 and the outer panel 110, respectively.

Figure 12:
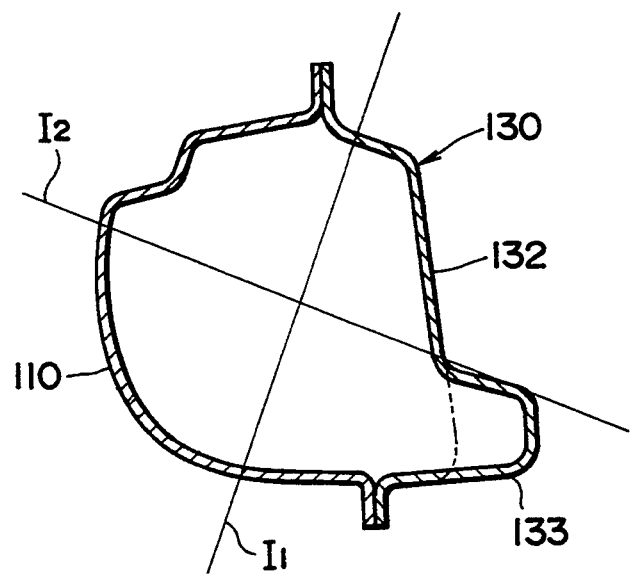
FIG. 12 is a sectional view showing another embodiment for varying the directions of two rectangular coordinate axes which become principal axes.
Figure 13:
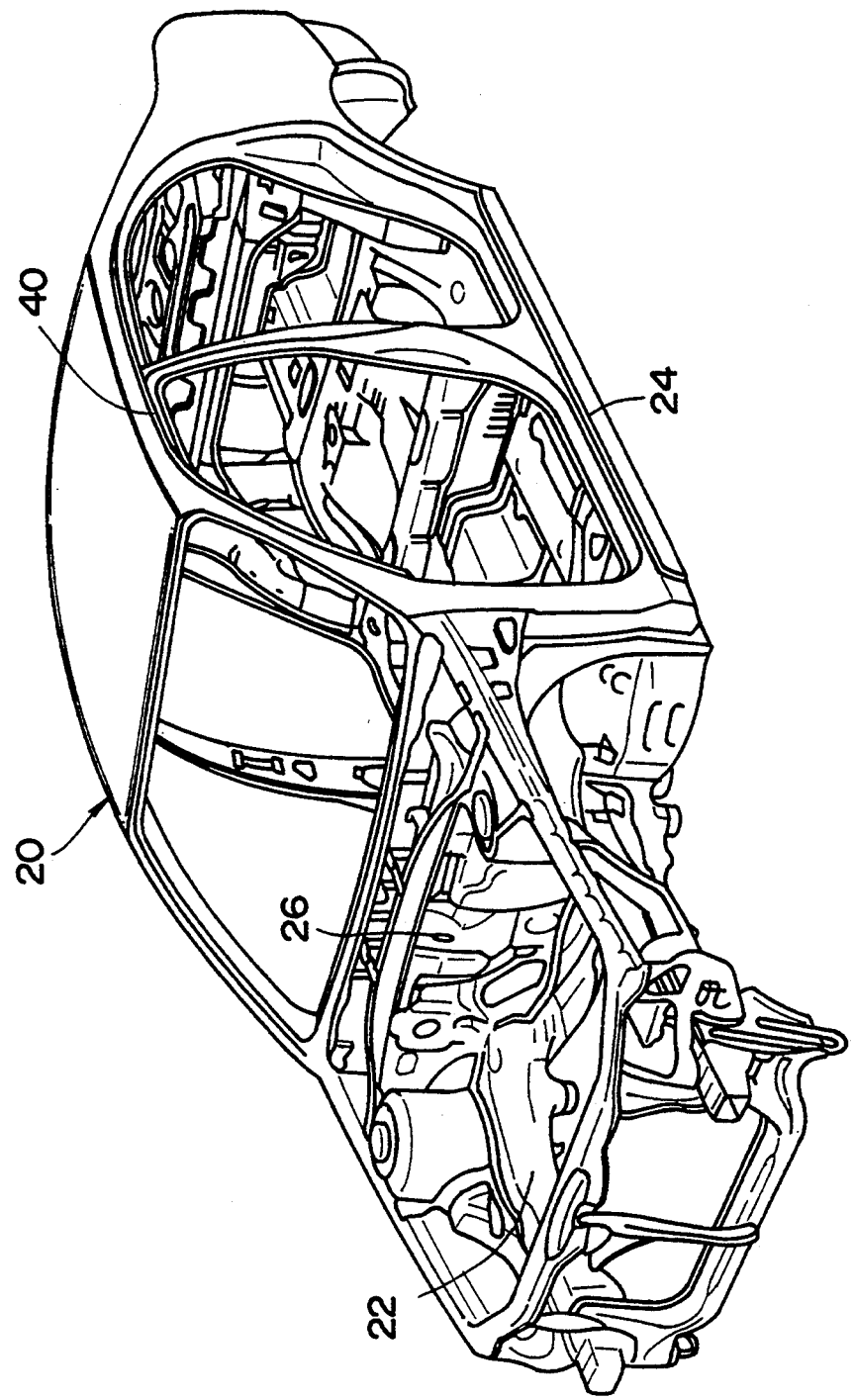
FIG. 13 is a perspective view showing structural members provided in the body of an automobile.
Figure 14:
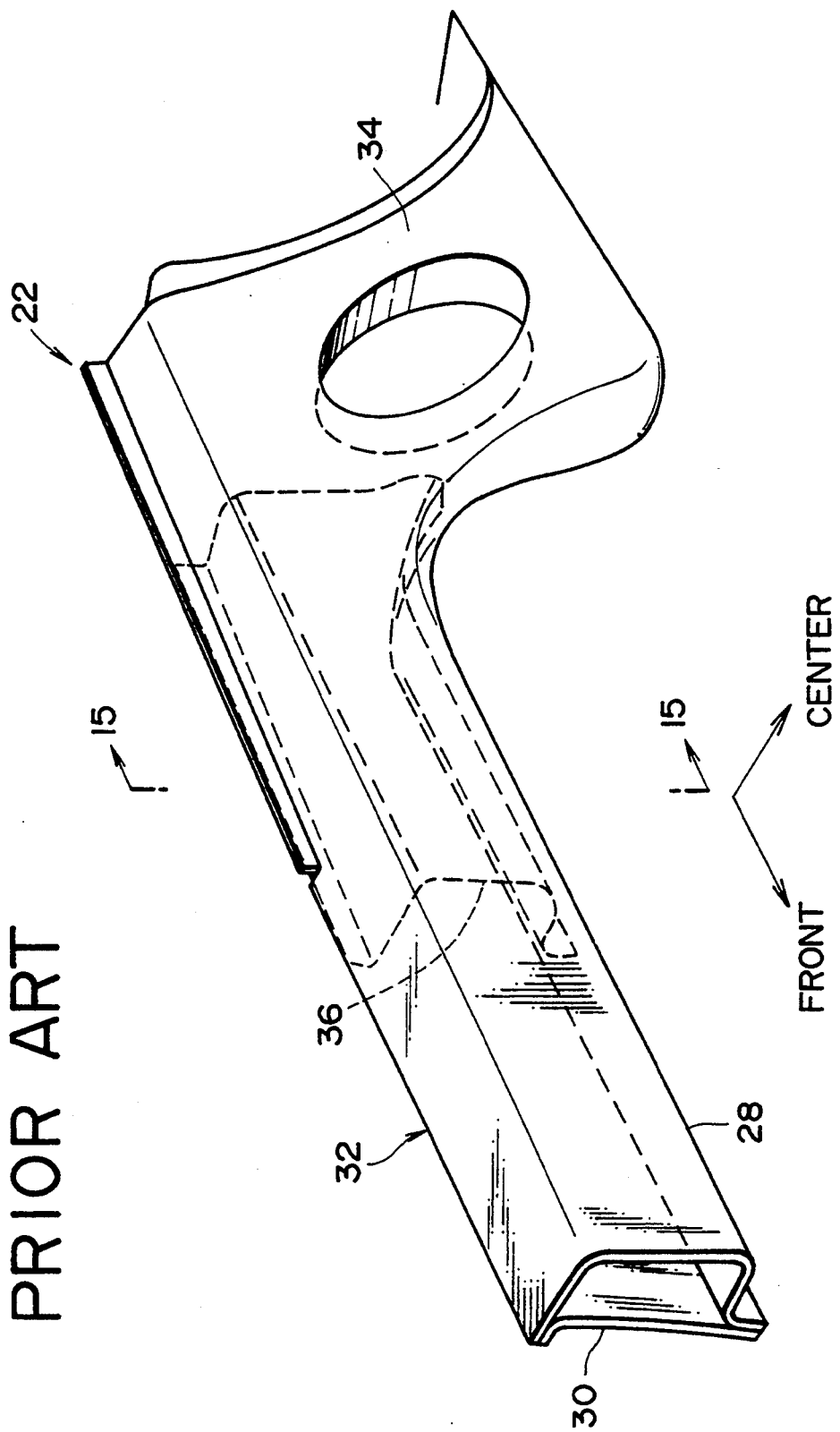
FIG. 14 is a perspective view showing a front side member of a conventional automobile.
Figure 15:
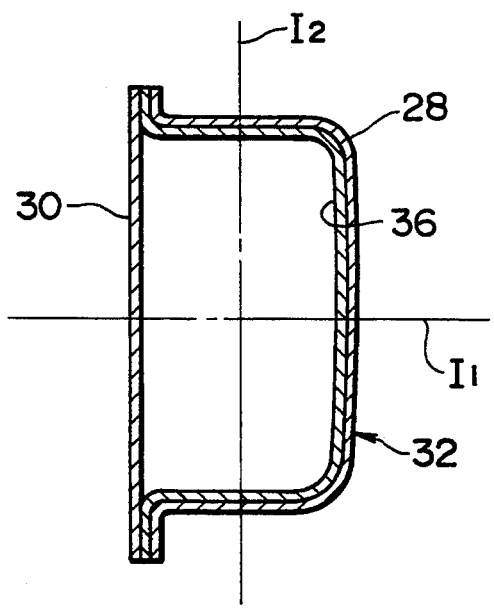
FIG. 15 is a sectional view taken along a line 15—15 of FIG. 14.
Figure 17:
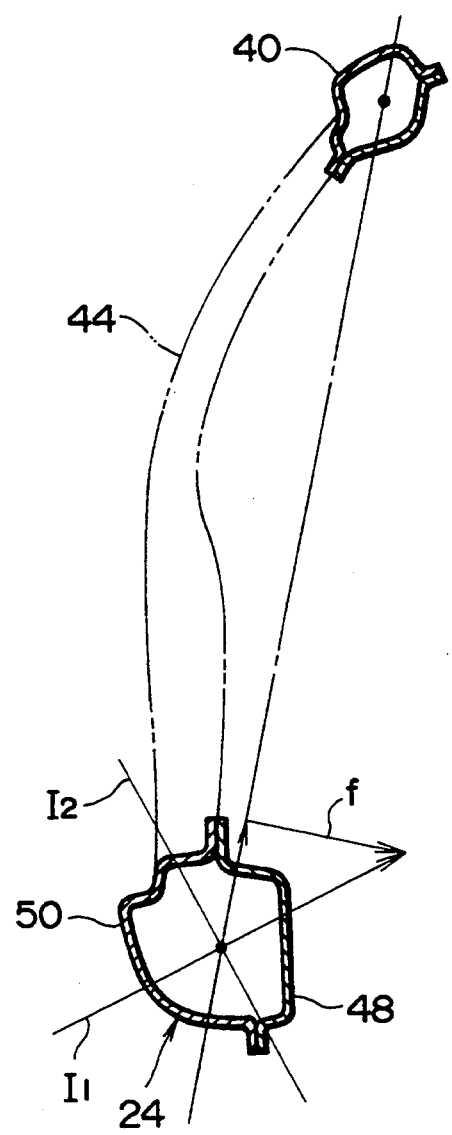
FIG. 17 is sectional views showing a roof side rail and a side sill in the side structure of the body of a conventional automobile, respectively.
Figure 18:
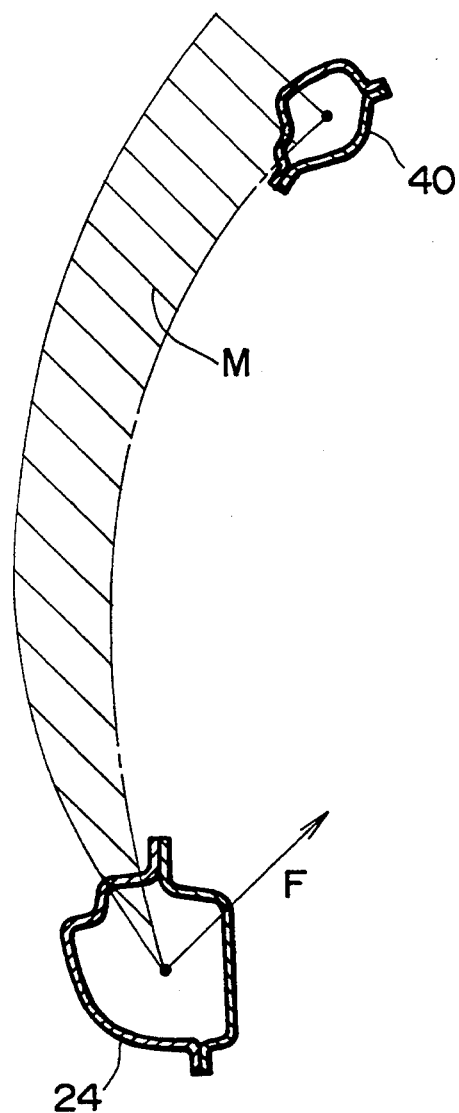
FIG. 18 is a similar sectional view to FIG. 17 but showing a moment distribution of a center pillar.
Figure 19:
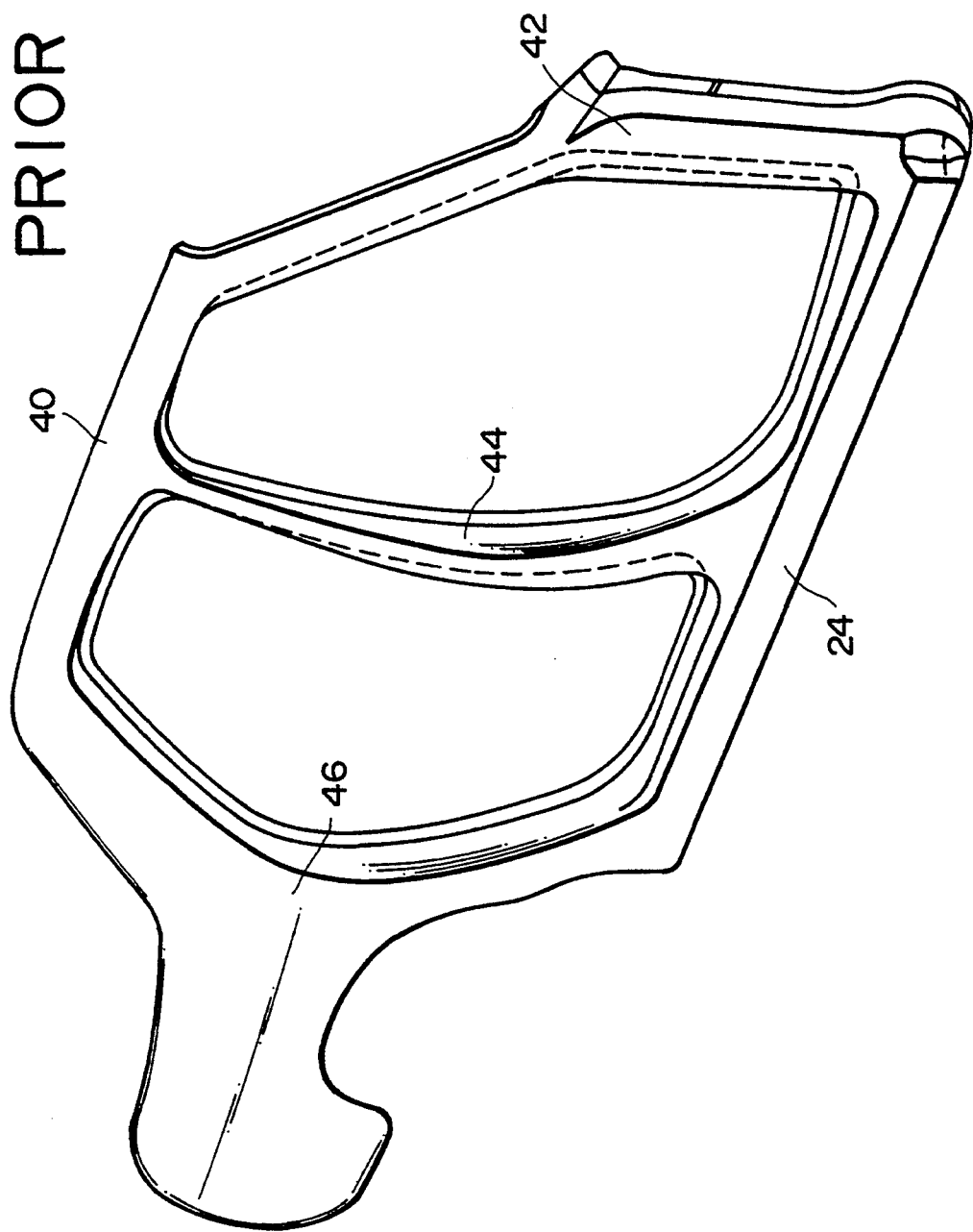
FIG. 19 is a perspective view showing a side structure of the body of conventional automobile.

In a rocker or side sill 130 shown in FIG. 12, the outer panel 110 has substantially the same shade as that in the embodiment described above, but an inner panel 132 has a projected portion 133 projecting inwardly in the lower portion. In accordance with this portion 133, the axis $I_1$ is passed through the closed cross section in the roof side rail.

What is claimed is:

1. A front side member of an automobile comprising:

a rigid portion formed in a closed cross section by an inner panel and an outer panel and extending in the longitudinal direction of a car body;

a base portion integral with said rigid portion and extending inwardly and downwardly therefrom in a lateral direction of the car body so as to be disposed at an inclination with respect to said rigid portion, said base portion having a closed cross section defined by the inner panel and the outer panel of said rigid portion;

said rigid portion having rectangular coordinate axes defining principal axes of the closed cross section thereof and is constructed and arranged to vibrate between an upper inside and a lower outside of the car body when vertical vibrations are applied to the car body during operation of the automobile, the direction of vibration of said rigid portion crossing the direction of inclination of said base portion, and at least one reinforcement disposed within said closed cross section of said rigid portion and extending substantially an entire length of said rigid portion, wherein said reinforcement is constructed and arranged so that an axis, which is one of the rectangular coordinate axes as principal axes of said closed cross section of said rigid portion and which maximizes a moment of inertia with respect to said axis, is directed downwardly from outside to inside in the lateral direction of the car body and intersects perpendicularly with a direction of vibration of said rigid portion so as to increase the rigidity of said rigid portion in the direction of vibration, the moment of inertia being calculated by the masses of said rigid portion and said at least one reinforcement.

* * * * *